(12) United States Patent
Russell

(10) Patent No.: US 6,528,565 B1
(45) Date of Patent: Mar. 4, 2003

(54) PROCESS FOR IMPARTING IMPROVED WHITENESS TO POLYOLEFIN RESINS

(75) Inventor: Mark K. Russell, Bartlesville, OK (US)

(73) Assignee: Phillips Petroleum Company, Bartlesville, OK (US)

( * ) Notice: Subject to any disclaimer, the term of this patent is extended or adjusted under 35 U.S.C. 154(b) by 0 days.

(21) Appl. No.: 09/705,491

(22) Filed: Nov. 3, 2000

(51) Int. Cl.[7] ................................................. C08K 5/17

(52) U.S. Cl. ........................ 524/247; 526/104; 526/135; 526/172

(58) Field of Search .................. 524/247; 526/104, 526/160, 165, 133, 135, 172

(56) References Cited

U.S. PATENT DOCUMENTS

| | | | | |
|---|---|---|---|---|
| 4,624,980 A | * | 11/1986 | Rekers et al. | |
| 4,708,979 A | | 11/1987 | Pedrazzetti et al. | 524/249 |
| 5,455,289 A | | 10/1995 | Caselli | 523/223 |
| 6,201,076 B1 | * | 3/2001 | Etherton et al. | |

* cited by examiner

*Primary Examiner*—Caixia Lu
(74) *Attorney, Agent, or Firm*—Kilpatrick Stockton LLP

(57) ABSTRACT

Hydroxyalkylamines can, in addition to imparting antistatic properties, significantly improve the color, i.e., the whiteness, of polyolefin resins produced with chromium-based catalysts and metallocene catalysts. Additionally, such compounds can impart improved whiteness at a loading significantly lower than that required to impart antistatic properties. Surprisingly, the discovered improvement in whiteness is not, however, observed in resins produced using other types of catalysts.

10 Claims, 4 Drawing Sheets

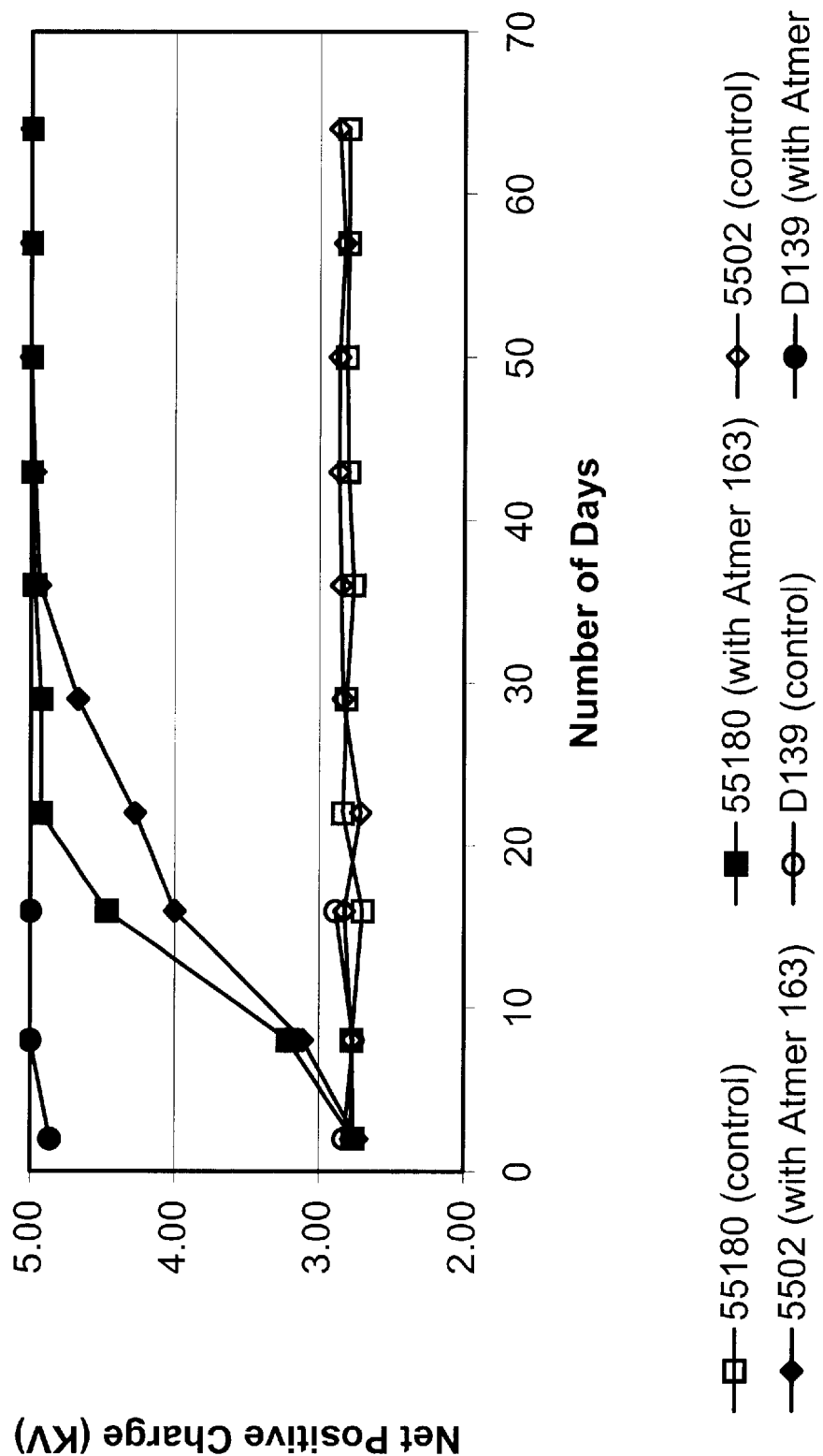

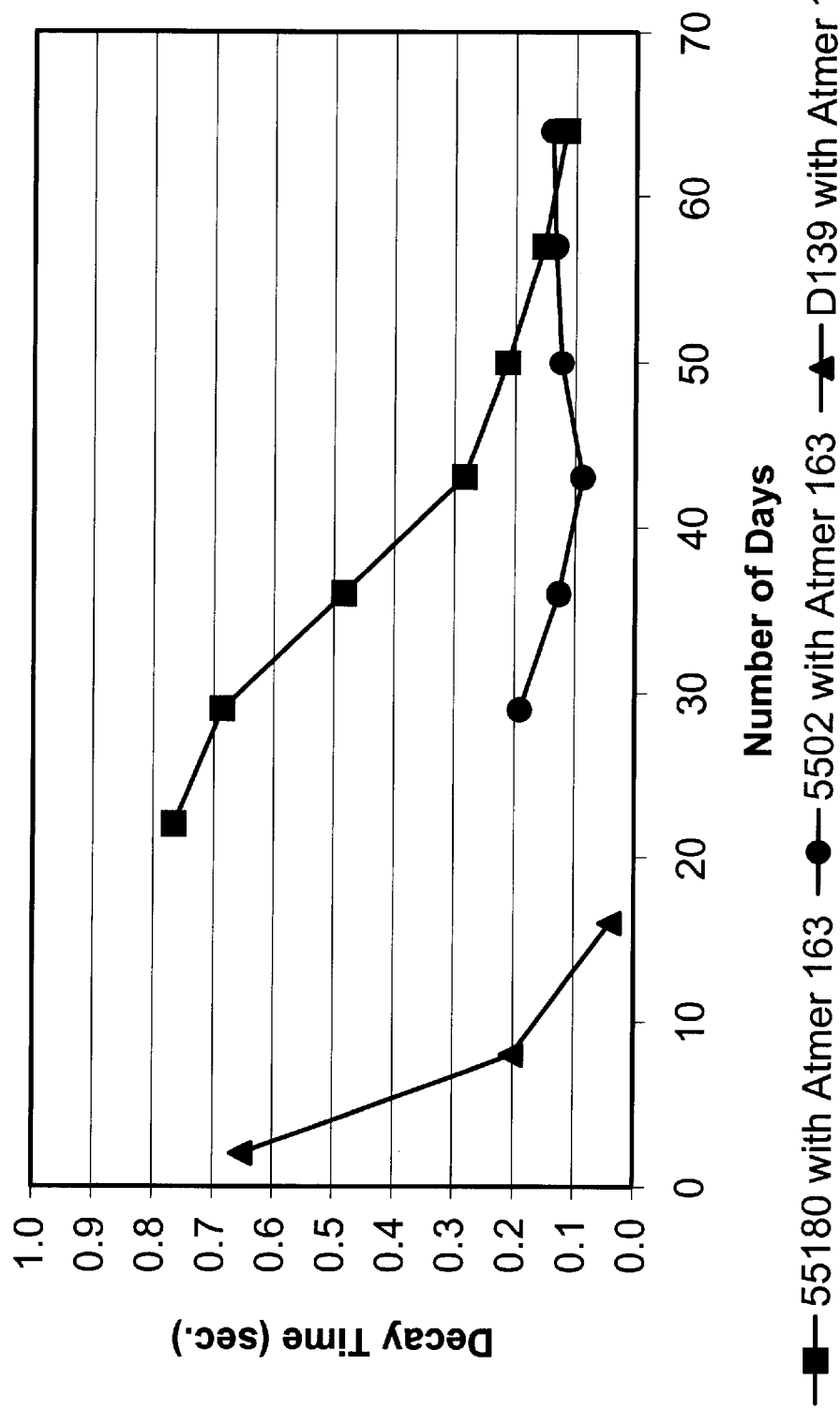

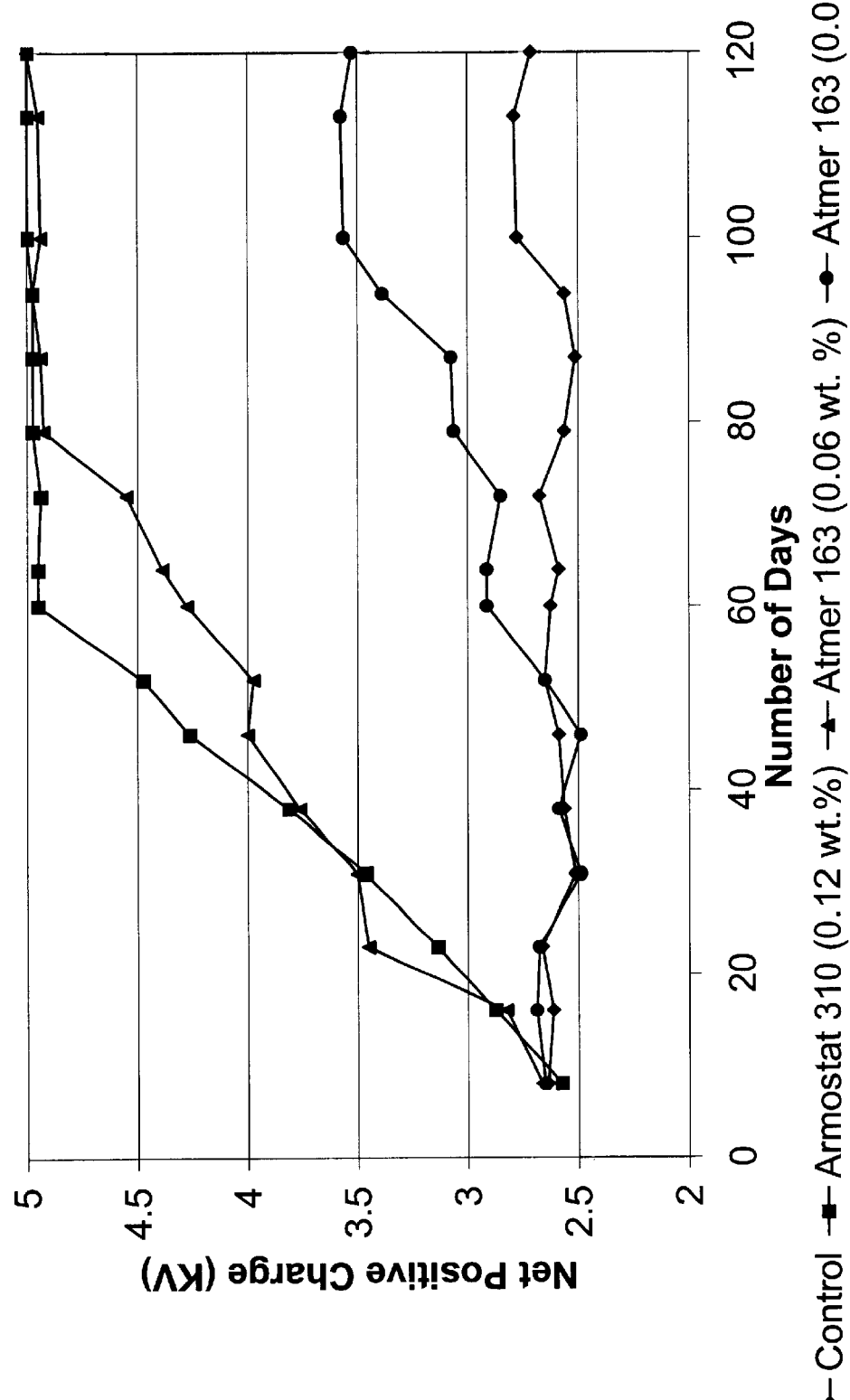

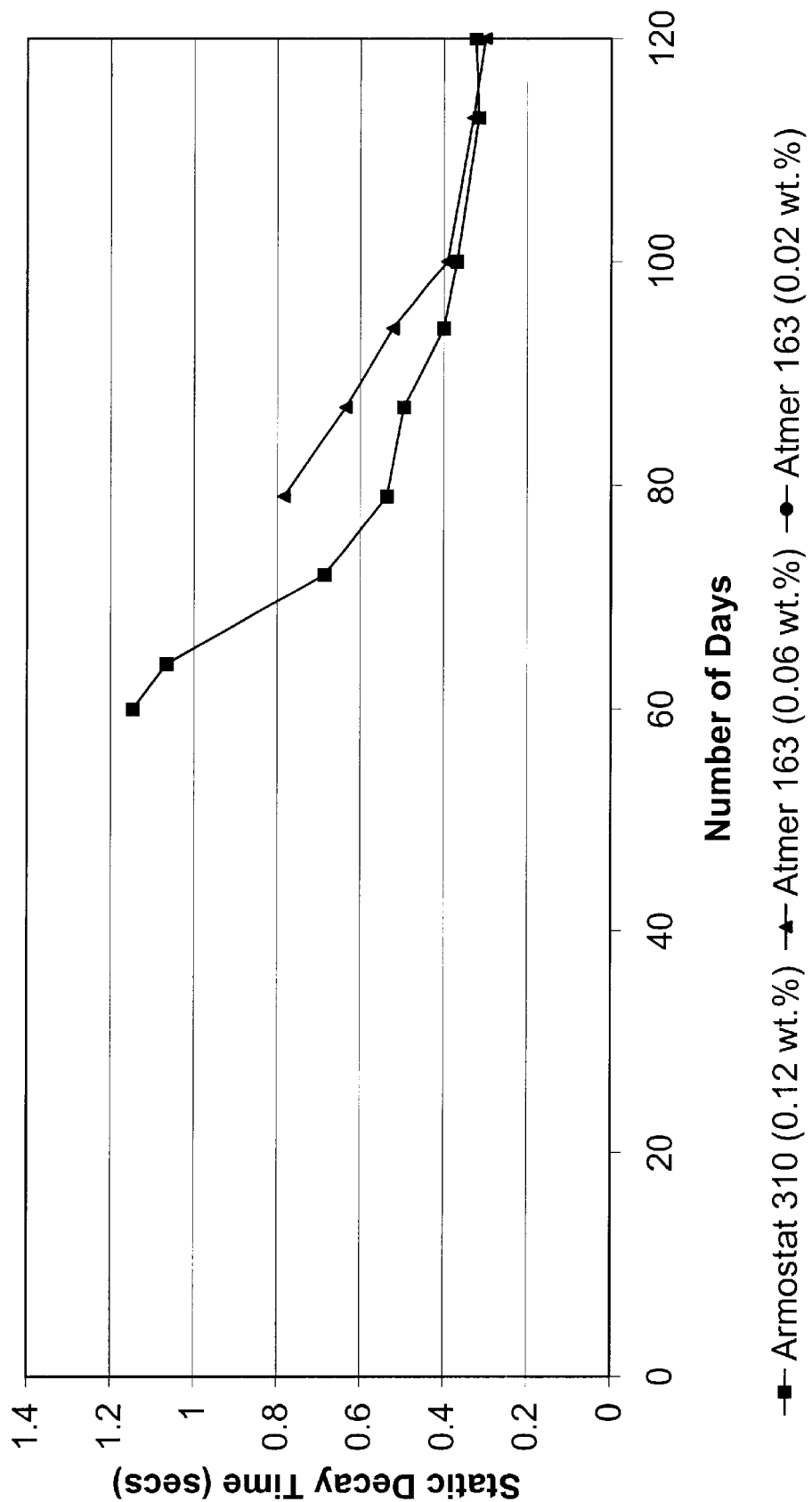

PROCESS FOR IMPARTING IMPROVED WHITENESS TO POLYOLEFIN RESINS

FIELD OF THE INVENTION

The present invention relates to additives for polyolefin resins, such as polyethylene and polypropylene.

BACKGROUND OF THE INVENTION

It is known to use a wide variety of additives for polyolefin resins, such as stabilizers, binders, anti-static compounds, and the like, to improve or impart desirable properties.

For example, Pedrazetti et al., U.S. Pat. No. 4,708,979, teach that stabilizers may be advantageously incorporated into spherically polymerized polyolefins by the addition of certain tertiary amine compounds to an emulsion or dispersion of the desired stabilizers. The stabilizers enumerated include antioxidants, UV absorbers, and light stabilizers. Further, Caselli, U.S. Pat. No. 5,455,289, teaches a process for incorporating additives in a step following polymerization, and following deactivation of the aluminum alkyl catalyst, but prior to flashing of the monomer.

It is also known that certain classes of compounds can impart improved anti-static properties to polyolefin resins. Specifically, such compounds, sometimes referred to as internal chemical antistatic compounds, are classified as anionic, cationic (or just 'ionic') and non-ionic types. Ionic antistatic compounds are recommended for polar resin systems such as PVC. Generally, ionic antistatic compounds are not recommended for, e.g., polyethylene due to their low heat stabilities. Non-ionic antistatic compounds are organic compounds composed of hydrophilic and hydrophobic portions. The compound migrates to the substrate surface and, via hydrogen bonding with atmospheric water, creates a microscopic layer of water on the surface. Chemical antistatic compounds are therefore dependent upon atmospheric moisture for their mechanism to dissipate static electricity.

Three general types of antistatic compounds are used in polyethylene and polypropylene: glycerol monostearate (GMS), ethoxylated fatty acid amines (also referred to as hydroxyalkylamines), and diethanolamides.

Typical concentrations of anti-static compounds vary by the application for the resin, but can range from several hundred to few thousand parts per million by weight of the resin. A typical loading for providing antistatic properties is about 1000 parts per million (0.10%) by weight of the resin. Certain applications, e.g., food contact, require that upper limits (e.g., on the order of 1500 parts per million (0.15%) established by the Food and Drug Administration be observed. Lower limits are determined by the applicable antistatic performance standard for the particular application. For example, polyolefin films used for packaging propellants, explosives, or other materials potentially subject to ignition by static discharges must meet rigorous antistatic performance standards.

SUMMARY OF THE INVENTION

It has now been discovered that hydroxyalkylamines can, in addition to imparting antistatic properties, significantly improve the color, i.e., the whiteness, of polyolefin resins produced with specific types of catalysts. Improvements in whiteness of resins can significantly improve their marketability for many applications with high standards for appearance. Surprisingly, the discovered improvement in whiteness is not, however, observed in resins produced using other types of catalysts.

Types of polyolefins for which the present invention may advantageously employed include linear low density polyethylene, high density polyethylene, polypropylene, and their copolymers, provided that such polyolefins are produced utilizing chromium-based or metallocene catalysts.

Thus, in one aspect of the invention, the whiteness of polyolefin resins produced by chromium and metallocene catalysts is improved by the addition of an effective amount of a hydroxyalkylamine.

In yet another aspect of the invention, the whiteness number of resins produced by chromium and metallocene catalysts is increased by at least about 15, alternatively, at least about 20, by the addition of an effective amount of at least one hydroxyalkylamine.

In another aspect, the invention is a polyolefin composition having improved whiteness which includes a polyolefin resin produced using a catalyst selected from the group consisting of chromium-based catalysts and metallocene catalysts, and an amount of at least one hydroxyalkylamine which is lower than that required to impart antistatic properties.

BRIEF DESCRIPTION OF THE DRAWINGS

FIG. 1 is a plot showing the measurement of net positive (static) charge on test plaques formed of three polyolefins in accordance with a testing protocol which is a modification of Federal Test Method Standard #101B, Method 4046.

FIG. 2 is a plot showing the measurement of static charge decay time on test plaques formed of the same three polyolefins identified with respect to FIG. 1, also in accordance with a testing protocol which is a modification of Federal Test Method Standard #A101B, Method 4046.

FIG. 3 is a plot showing the measurement of net positive (static) charge on test plaques formed of a single polyolefin, but having varying amounts of additive, in accordance with a testing protocol which is a modification of Federal Test Method Standard #101B, Method 4046.

FIG. 4 is a plot showing the measurement of static charge decay time on test plaques formed of the same single polyolefin identified with respect to FIG. 3, in accordance with a testing protocol which is a modification of Federal Test Method Standard #101B, Method 4046.

Preparation of Static Decay Testing Chamber

1. Establish a controlled humidity environment by placing an open dish of a saturated solution of magnesium nitrate inside the testing chamber. This will yield a ~53% relative humidity environment at room temperature (72° F.).
2. Periodically monitor the temperature and relative humidity inside the chamber.

Preparation of Sample Plaques

1. Prepare four 3"×5"×⅛" plaques for each sample to be tested. Use~23 g of pellets for each template. Ensure the templates are filled completely and adjust the amount of pellets used, if necessary.
2. Handle plaques with gloves on. Place them in the wooden holding trays and place the trays inside the testing chamber.

Measurement of Static Decay Properties

A. Measuring Net Positive Charge on Plaques

1. Follow the standard operating procedure for using the static decay meter.
2. Before making measurements each time, check the calibration of the static decay meter using the supplied CM-1 calibration module.
3. Handle the plaques with forceps or by the edges only. Mount the sample plaque in the Faraday Cage and finger-tighten the four knobs. Record the initial charge, with no voltage applied, for each sample.
4. Apply a positive 5 kilovolt charging voltage e to the plaque and record the immediate total sample charge accepted.
5. Calculate the net positive sample charge by subtracting the initial charge from the total sample charge accepted.
6. When the net positive sample charge on a plaque is 5 Kilovolts, the static decay time can be measured. It may, depending on the particular sample, take several weeks to get to this point. Continue measuring the initial charge and begin measuring the static decay time.

B Measuring Static Decay Time

1. Set the cutoff setting to 10% of initial charge.
2. Apply a charge of positive 5 Kilovolts to the sample. Immediately after the sample charge gauge reads full scale, press the test button.
3. Record the decay time in seconds.
4. Repeat steps two and three to obtain a second decay time for positive 5 Kilovolts.
5. Repeat steps two and three with a charge of negative 5 Kilovolts to obtain two readings of the static decay with this voltage applied.
6. Measure the static decay time at least weekly.

DETAILED DESCRIPTION AND PREFERRED EMBODIMENTS

Effective hydroxyalkylamines may be of either natural or synthetic origin, and hydroxyalkylamines of natural origin are typically sourced from tallow. Hydroxyalkylamine compounds may include an aliphatic hydrocarbon chain which is saturated or which has one or more points of unsaturation.

One preferred aspect of the invention employs one or more hydroxyalkylamines having the formula:

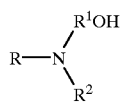

wherein R is a $C_8$–$C_{22}$ aliphatic hydrocarbon moiety, $R^1$ is a $C_2$ or higher aliphatic hydrocarbon moiety, and $R^2$ is a $C_2$ or higher aliphatic hydrocarbon or $C_2$ or higher hydroxy aliphatic hydrocarbon moiety.

In another aspect, the whiteness of resins produced by chromium or metallocene catalysts is improved by the addition of an effective amount of one or more monoalkoxylated or dialkoxylated tertiary amines of the above formula. The hydroxyalkylamine may, by way of example, be one in which R is a $C_{10}$–$C_{18}$ aliphatic hydrocarbon moiety, alternatively a $C_{13}$–$C_{18}$ aliphatic hydrocarbon moiety, alternatively a $C_{13}$–$C_{15}$ aliphatic hydrocarbon moiety, alternatively a $C_{14}$–$C_{18}$ aliphatic hydrocarbon moiety, alternatively a mono-unsaturated or di-unsaturated aliphatic hydrocarbon moiety, alternatively —$(CH_2)_8$—CH=CH—$(CH_2)_7CH_3$, alternatively mixtures thereof.

In a still further aspect of the invention, a polyolefin composition having (a) a polyolefin resin produced using a catalyst selected from the group consisting of chromium-based catalysts and metallocene catalysts, and (b) an effective amount of at least one hydroxyalkylamine of the formula:

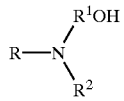

wherein R is a $C_8$–$C_{22}$ aliphatic hydrocarbon moiety, $R^1$ is a $C_2$ or higher aliphatic hydrocarbon moiety, and $R^2$ is a $C_2$ or higher aliphatic hydrocarbon or $C_2$ or higher hydroxy aliphatic hydrocarbon moiety, has a whiteness number (defined below) which is at least at least about 15, alternatively, at least about 20 greater than the whiteness number of the same polyolefin resin not having any hydroxyalkylamine.

As can be seen in FIG. 1, all three resin samples having the hydroxyalkylamine antistatic additive are capable of accumulating 5000 volts of static charge, while the control plaques cannot. Each additive-containing resin plaque accumulates the static charge at a different rate on account of the differences in molecular architecture among the three. Application of the potential to the plaques causes migration of the additive to the surface of the plaque, where it becomes effective to form a static-dissipating film of water. The molecular architecture of the polyolefin therefore affects the migration path—and relative migration speed—of the antistatic additive. This is evidenced by the relatively rapid charge accumulation in resin D139 (a linear low density polyethylene) in which the molecular matrix has enough non-crystalline space to permit relatively rapid migration. Resins 5502 and 55180, in contrast, are high-density polyethylenes having considerably different molecular architecture, and therefore considerably different rates of migration.

FIG. 2, which tracks the same time period as FIG. 1, depicts the improvement, over the course of the testing, of the static decay time for each of the resins. As can be readily seen, the resins having the antistatic additive at a loading of 0.12% by weight (see Table 1 below) can accumulate a significant static charge and then can dissipate that charge within a very short time.

As these figures show, the antistatic additive is effective to impart antistatic properties at the stated loading of 0.12% by weight, while, as explained below, an improvement in whiteness is observed in only two of the three tested resins.

EXAMPLES

Samples of each tested polyethylene composition were analyzed by a Hunter Lab D25 Optical Sensor purchased from Hunter Associate Laboratory, Inc. This analysis provided Hunter "a", Hunter "b", and Hunter "L" color values for each sample.

The Hunter "a" value indicates color between red and green. Negative Hunter "a" values indicate greenness; positive Hunter "a" values indicate redness.

The Hunter "b" value indicates color variation between blue and yellow. Negative Hunter "b" values indicate blueness; positive Hunter "b" value indicate yellowness.

The Hunter "L" value indicates color variation between white and black. Negative hunter "L" values indicate blackness; positive Hunter "L" values indicate whiteness.

Hunter "a", "b", and "L" values were converted to a standard polyethylene whiteness number (PE#) by the formula:

$$PE\# = L \cdot (0.0382L - 0.056a - 0.3374b)$$

A higher PE# is an indicator of a whiter polyethylene.

Generally speaking, an increase in whiteness number must be about 15, alternatively about 20, in order to be visually observed.

In the following Examples, the polyethylene resins tested were identified as 55180 (produced with a Ziegler-Natta catalyst), 5502 (produced with a chromium-based catalyst), and D139 (produced with a metallocene catalyst).

The additives identified in the Examples are Irganox® 1076, an antioxidant, Atmer® 163, a synthetic tertiary hydroxyalkylamine, wherein R is a $C_{13}$–$C_{15}$ hydrocarbon moiety, available from Ciba Specialty Chemicals, Wilmington, Del., and Armostat® 310, a mixture of tertiary hydroxyalkylamines (bis(2-hydroxyethyl) tallowamines) available from Akzo Nobel Polymer Chemicals LLC, Chicago, Ill.

TABLE I

| Example | Resin | Additives | Weight % | PE# |
|---------|-------|-----------|----------|-----|
| A | 5502 | Irganox ® 1076 | 0.05 | 194 |
| B | 5502 | Irganox ® 1076 | 0.05 | 294 |
|   |      | Atmer ® 163    | 0.12 |     |
| C | D139 | Irganox ® 1076 | 0.05 | 233 |
| D | D139 | Irganox ® 1076 | 0.05 | 277 |
|   |      | Atmer ® 163    | 0.12 |     |
| E | 55180 | Irganox ® 1076 | 0.05 | 287 |
| F | 55180 | Irganox ® 1076 | 0.05 | 291 |
|   |       | Atmer ® 163    | 0.12 |     |

As these data show, the hydroxyalkylamine additive imparts-in addition to antistatic properties—a significant increase in color number (increases of 100 and 44, respectively) for the polyethylenes produced using chromium-based and metallocene catalysts (5502 and D139), while the increase seen for polyethylene produced from a Ziegler-Natta catalyst (55180) (a measured increase of 4) is within the range of experimental error (+or –15 PE#) for this test and is below the threshold which may be visually observed, namely, +or –15 PE#.

The amounts of such hydroxyalkylamines commonly used to impart antistatic properties (e.g., 0.12% by weight— or 1200 parts per million by weight) have been observed to impart the improvement in whiteness which the object of the present invention. More importantly, however, the observed whiteness improvement of the present invention is achieved at much lower levels of the hydroxyalkylamine than would be required to impart antistatic properties, e.g., about 0.005% to about 0.05%, alternatively, about 0.005% to about 0.02%, by weight of the resin.

This is illustrated by the experimental results appearing in FIGS. 3 and 4 and in Table II.

Plaques formed of a single polyolefin, but containing varying amounts of a hydroxyalkylamine, were tested for antistatic properties using the protocol described above. As shown in FIG. 3, plaques containing 0.06% by weight Atmer® 163 and 0.12% by weight Armostat® 310, respectively, were able to accumulate a full 5000 volts of static charge. But even after 120 days, neither the plaque containing 0.02% by weight Atmer® 163 nor the control plaque could do so. And, as shown in FIG. 4, the plaques containing 0.06% by weight Atmer® 163 and 0.12% by weight Armostat® 310, respectively, were able to dissipate the full 5000 volt static charge in a very short period of time. Thus, according to these data, a threshold loading of hydroxyalkylamine of greater than about 0.05% is necessary to permit the polyolefin plaque to accumulate the full 5000 volt static charge.

As the following color data in Table II show, however, these same plaques exhibited improved whiteness at a hydroxyalkylamine loading of just 0.02% by weight:

TABLE II

| Example | Resin | Additives | Weight % | PE# |
|---------|-------|-----------|----------|-----|
| G | 5502 | Irganox ® 1076 | 0.05 | 218 |
| H | 5502 | Irganox ® 1076 | 0.05 | 294 |
|   |      | Armostat ® 310 | 0.12 |     |
| J | 5502 | Irganox ® 1076 | 0.05 | 291 |
|   |      | Atmer ® 163    | 0.06 |     |
| K | 5502 | Irganox ® 1076 | 0.05 | 282 |
|   |      | Atmer ® 163    | 0.02 |     |

Even at a hydroxyalkylamine loading of just 0.02% by weight of the polyolefin, Example K, for instance, shows an improvement in PE# of 64. Accordingly, these data demonstrate that even at loading levels insufficient to provide full antistatic properties, hydroxyalkylamine compounds impart improved whiteness to a polyolefin resin produced by a chromium-based catalyst.

Although the present invention has been described with reference to specific details of certain embodiments thereof, it is not intended that such details should be regarded as limitations upon the scope of the invention except insofar as they are included in the accompanying claims.

What is claimed is:

1. A process for improving the whiteness of a polyolefin comprising the step of combining (a) at least one polyolefin, said polyolefin being produced using a chromium-based catalyst; and (b) an effective amount of at least one hydroxyalkylamine of the formula:

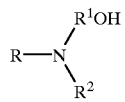

wherein R is a $C_8$–$C_{22}$ aliphatic hydrocarbon moiety, $R^1$ is a $C_2$ or higher aliphatic hydrocarbon moiety, and $R^2$ is a $C_2$ or higher aliphatic hydrocarbon or a $C_2$ or higher hydroxy aliphatic hydrocarbon moiety; and wherein the amount of hydroxyalkylamine is effective to increase the whiteness number of said polyolefin by at least 15.

2. The process of claim 1, wherein the whiteness number of said polyolefin is increased by at least about 44.

3. The process of claim 1, wherein R is a $C_{13}$–$C_{15}$ aliphatic hydrocarbon moiety.

4. The process of claim 1, wherein R is a $C_{14}$–$C_{18}$ aliphatic hydrocarbon moiety.

5. The process of claim 1, wherein R is a mono-or di-unsaturated aliphatic hydrocarbon moiety.

6. The process of claim 1, wherein R is —$(CH_2)_8$—CH=CH—$(CH_2)_7CH_3$.

7. The process of claim 1, wherein said hydroxyalkylamine is present in amount of from about 0.005% to about 0.15% by weight of the polyolefin.

8. A process for improving the whiteness of a polyolefin comprising the step of combining (a) at least one polyolefin, said polyolefin being produced using a chromium-based catalyst; and (b) a whitening effective amount of at least one hydroxyalkylamine of the formula:

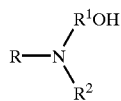

wherein R is a $C_8$–$C_{22}$ aliphatic hydrocarbon moiety, $R^1$ is a $C_2$ or higher aliphatic hydrocarbon moiety, and $R^2$ is a $C_2$ or higher aliphatic hydrocarbon or a $C_2$ or higher hydroxy aliphatic hydrocarbon moiety.

9. The process of claim 8, wherein the amount of the hydroxyalkylamine is no more than about 0.02%.

10. The process of claim 8, wherein the whiteness number of said polyolefin is increased by at least about 44.

* * * * *